US009569159B2

(12) United States Patent
Newell (10) Patent No.: US 9,569,159 B2
(45) Date of Patent: *Feb. 14, 2017

(54) APPARATUS, SYSTEMS AND METHODS FOR PRESENTING DISPLAYED IMAGE INFORMATION OF A MOBILE MEDIA DEVICE ON A LARGE DISPLAY AND CONTROL OF THE MOBILE MEDIA DEVICE THEREFROM (71) Applicant: EchoStar Technologies L.L.C., Englewood, CO (US)

(72) Inventor: Nicholas Newell, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 350 days.

This patent is subject to a terminal disclaimer.

(21) Appl. No.: 14/492,349

(22) Filed: Sep. 22, 2014

(65) Prior Publication Data
US 2015/0009098 A1 Jan. 8, 2015

Related U.S. Application Data (63) Continuation of application No. 13/020,597, filed on Feb. 3, 2011, now Pat. No. 8,843,358.

(51) Int. Cl.
G06F 9/455 (2006.01)
G06F 3/041 (2006.01)
(Continued)

(52) U.S. Cl.
CPC .............. *G06F 3/14* (2013.01); *G06F 1/1643* (2013.01); *G06F 3/04883* (2013.01);
(Continued)

(58) Field of Classification Search
CPC ...... G06F 3/14; G06F 1/1643; G06F 3/04883; G06F 3/04886; G06F 3/1454; G09G 2340/0407; G09G 2340/145; G09G 2370/027
(Continued)

(56) References Cited

U.S. PATENT DOCUMENTS 7,054,965 B2   5/2006   Bell et al.
7,209,874 B2   4/2007   Salmonsen
(Continued)

FOREIGN PATENT DOCUMENTS

JP   2007095080 A   4/2007
JP   2010009516 A   1/2010
WO   2010001581 A1   6/2009

OTHER PUBLICATIONS

Ulrich et al "A Mobile Live Video Learning System for Large-Scale Learning System-Design and Evaluation", IEEE Transactions on Learning Technologies, vol. 3, Issue 1, 2010.
(Continued)

*Primary Examiner* — Kamini S Shah
*Assistant Examiner* — Juan Ochoa
(74) *Attorney, Agent, or Firm* — Lowe Graham Jones, PLLC (57) ABSTRACT Systems and methods are operable to concurrently present images on a small display of a mobile media device and a large display of a media presentation system. An exemplary method receives emulated information from a mobile media device, wherein the emulated information corresponds to at least one image that is being currently presented on a display of the mobile media device; generates at least one image based upon the received emulated information, wherein the at least one image is configured for presentation on a display of a media system; and communicates the at least one image
(Continued)

to a display of the media system. The image presented on the display of the media system is substantially the same image presented on the display of the mobile media device. The image presented on the display of the media system is substantially larger than the image presented on the display of the mobile media device.

20 Claims, 5 Drawing Sheets (51) Int. Cl.
G09G 5/00 (2006.01)
G06F 3/14 (2006.01)
G06F 1/16 (2006.01)
G06F 3/0488 (2013.01)

(52) U.S. Cl.
CPC ........ G06F 3/04886 (2013.01); G06F 3/1454 (2013.01); G09G 2340/0407 (2013.01); G09G 2340/145 (2013.01); G09G 2370/027 (2013.01)

(58) Field of Classification Search
USPC ..................................... 703/23; 345/2.2, 173
See application file for complete search history.

(56) References Cited

U.S. PATENT DOCUMENTS

| | | | |
|---|---|---|---|
| 7,689,908 B2* | 3/2010 | Yan ........................... | G06F 8/38 715/238 |
| 7,986,961 B2 | 7/2011 | Gasborro et al. | |
| 8,060,074 B2 | 11/2011 | Danford et al. | |
| 8,302,030 B2 | 10/2012 | Soroca et al. | |
| 2002/0080092 A1 | 6/2002 | Rantanen | |
| 2003/0236088 A1 | 12/2003 | Im | |
| 2010/0007711 A1* | 1/2010 | Bell ........................ | H04N 7/142 348/14.02 |
| 2010/0039380 A1* | 2/2010 | Lanier ................... | G06F 1/1601 345/156 |
| 2010/0245371 A1 | 9/2010 | Ishii et al. | |
| 2010/0259464 A1 | 10/2010 | Chang et al. | |
| 2010/0318598 A1 | 12/2010 | Yun et al. | |
| 2011/0096230 A1 | 4/2011 | Komiya et al. | |
| 2012/0081299 A1 | 4/2012 | Xiao et al. | |
| 2012/0092277 A1 | 4/2012 | Momchilov | |

OTHER PUBLICATIONS

Sun et al, "ReDi: An Interactive Virtual Display System for Ubiquitous Devices", MM '10, Oct. 25-29, 2010.

* cited by examiner

APPARATUS, SYSTEMS AND METHODS FOR PRESENTING DISPLAYED IMAGE INFORMATION OF A MOBILE MEDIA DEVICE ON A LARGE DISPLAY AND CONTROL OF THE MOBILE MEDIA DEVICE THEREFROM

PRIORITY CLAIM

This patent application is a Continuation of U.S. Non-Provisional patent application Ser. No. 13/020,597, filed Feb. 3, 2011, published as U.S. Publication No. 2012/0200571 A1, entitled "APPARATUS, SYSTEMS AND METHODS FOR PRESENTING DISPLAYED IMAGE INFORMATION OF A MOBILE MEDIA DEVICE ON A LARGE DISPLAY AND CONTROL OF THE MOBILE MEDIA DEVICE THEREFROM," and issued as U.S. Pat. No. 8,843,358 on Sep. 23, 2014, the content of which is incorporated herewith in its entirety.

BACKGROUND

Mobile media devices, such as a cellular phone, a small touch sensitive communication device, a small portable music player, or the like, are often configured to present information to the user on a relatively small display component. However, the information presented on the small display may be relatively hard to discern and/or understand. For example, when a video clip is presented on the relatively small display, or presented on a small portion of the small display, the subject matter of the presented video clip may be hard to discern. As another example, text presented on the display using small letters may be difficult to see and read.

Further, the difficulty in discerning and understanding presented information on a small display may make operation of the small mobile media device relatively difficult. For example, if identifiers of virtual touch sensitive buttons presented on a touch sensitive display are not easily read because of the small text size, the user may have difficulty in identifying the proper virtual touch sensitive buttons to operate the small mobile media device. Further, if the user has relatively large fingers and/or does not have a sufficient amount of dexterity, such users may find it difficult to touch and/or navigate about the presented virtual touch sensitive buttons that are used to control the small mobile media device.

Accordingly, there is a need in the arts to improve the ability of a user to discern and understand information presented on a relatively small display of a mobile media device.

SUMMARY

Systems and methods of concurrently presenting images on a small display of a mobile media device and a large display of a media presentation system are disclosed. An exemplary embodiment receives emulated information from a mobile media device, wherein the emulated information corresponds to at least one image that is being currently presented on a display of the mobile media device; generates at least one image based upon the received emulated information, wherein the at least one image is configured for presentation on a display of a media system; and communicates the at least one image to a display of the media system. The image presented on the display of the media system is substantially the same image presented on the display of the mobile media device. The image presented on the display of the media system is substantially larger than the image presented on the display of the mobile media device.

BRIEF DESCRIPTION OF THE DRAWINGS

Preferred and alternative embodiments are described in detail below with reference to the following drawings.

DETAILED DESCRIPTION

Figure 1:
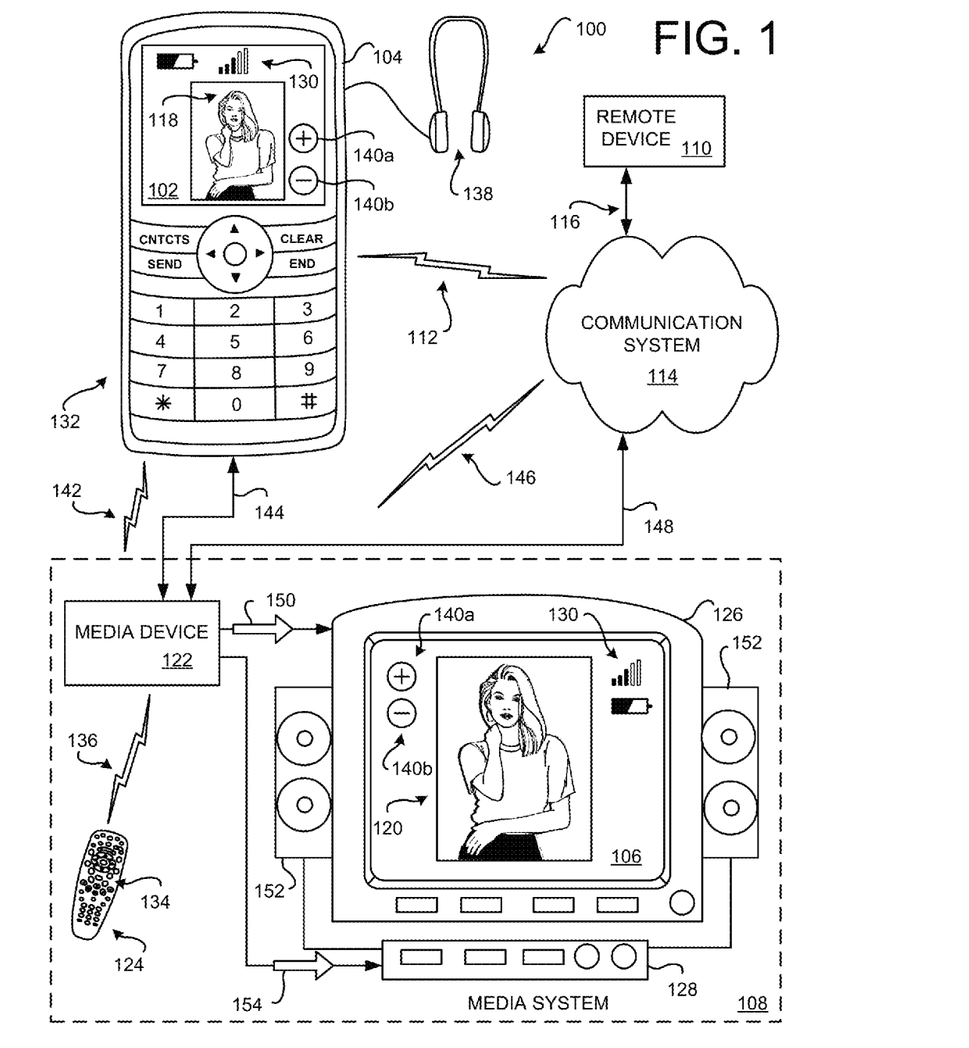
FIG. 1 is a block diagram of an embodiment of a media presentation system configured to concurrently present information on a relatively small display of a mobile media device and on a relatively large display in communication with the mobile media device.

FIG. 1 is a block diagram of an embodiment of a media presentation system 100 configured to concurrently present information on a relatively small display 102 of a mobile media device 104 and on a relatively large display 106 of a media system 108. Embodiments of the mobile media device 104 communicate emulated display information that is presented on its display 102 to the media system 108. Alternatively, or additionally, the mobile media device 104 may provide emulated active information that causes the media system 108 to access a remote device 110 and obtain the information therefrom. Based on the emulated display and/or active information received from the mobile media device 104 (and/or the remote device 110), the media system 108 is configured to operate the display 106 in a manner that substantially emulates the presentation of information on the display 102 of the mobile media device 104. That is, the emulated display and/or active information presented on the larger display 106 is substantially the same as, or even identical to, the relatively smaller display information presented on the display 102 of the mobile media device 104.

Embodiments of the media presentation system 100 are further configured to exchange command and control information between the mobile media device 104 and the media system 108. The command and control information is configured such that operations performed on the mobile media device 104 control operation of one or more of the components of the media system 108. Further, the command and control information communicated from the media system 108 to the mobile media device 104 is configured to control operation of the mobile media device 104.

The emulated display information that is communicated from mobile media device 104 to the media system 108 may be video image information and audio information, still image information, textual information, and/or graphical icon information. The emulated active information may be an active link (e.g.; hypertext link, hyper link, uniform resource locators etc.) configured to establish a communication link from a media device 122 or another component of the media system 108 to the remote device 110.

In some operating situations, remote information corresponding to the emulated display information and/or emulated active information (generically referred to as emulated information) presented on the display 102 of the mobile media device 104 may be obtained from the remote device 110. For example, the mobile media device 104 may be presenting a video clip obtained from a website on its display 102. Here, the mobile media device 104 establishes a radio frequency (RF) communication link 112 to a communication system 114. For example, a portion of the communication system 114 may comprise a cellular phone network. The remote device 110 may be configured to provide a video clip to the mobile media device 104 via an established Internet communication link 116. Since the mobile media device 104 has included information that identifies itself as a mobile media device with a relatively small display 102, the remote device 110 may send a low resolution video clip to the mobile media device 104 that employs a video image data format that is relatively less data intensive than the data format of a corresponding high resolution video clip. The low resolution video clip communicated to the mobile media device 104 conserves bandwidth of the communication system 114 and/or processing capacity of the mobile media device 104. For example, the MPEG video frames of the low resolution video clip may be configured with a reduced image data set that is configured to present relatively small, low resolution images on the relatively small display 102 of the mobile media device 104.

However, if the same low resolution video clip is reproduced by the larger display 106 of the media system 108, the presented video images may be blurry and hard to discern by the user since the amount of video data in the low resolution video clip is not likely sufficient to generate a clear, large-size video image that is suitable for presentation on the larger display 106. In this situation, the mobile media device 104 may communicate the emulated display and/or active information, and/or the command and control information, to the media system 108 that causes the media system 108 to access a corresponding high resolution video clip from the remote device 110. Accordingly, the low resolution video clip may be presented on the smaller display 102 of the mobile media device 104 concurrently with presentation of the high resolution video clip on the larger display 106 of the media system 108.

The emulated display information may also include audio information. The audio information may be communicated from the mobile media device 104 to the media system 108. Alternatively, the mobile media device 104 may provide command and control information that causes the media system 108 to access the audio information from the remote device 110. Accordingly, the user will be able to hear the audio content concurrently presented by the mobile media device 104 and the media system 108. However, in some situations, the audio content presented by the media system 108 may have a higher fidelity and/or a higher volume capability than the audio content presented by the mobile media device 104.

For example, the above-described video clip may also include an audio portion that is emitted as sounds from small speakers (not shown) of the mobile media device 104. The audio portion of the low resolution video clip communicated to the mobile media device 104 may be limited to a single audio channel (mono format), or may be limited to two channels (stereo format). In contrast, the audio portion of the high resolution video clip communicated to the media system 108 may include multiple audio channels, such as used in a 5.1 surround sound format. Thus, the user will hear the audio portion presented by the media system 108 using a high fidelity multiple audio channel format.

To facilitate description of an exemplary embodiment, a relatively small sized, low resolution image 118 of a woman is presented on the display 102 of the mobile media device 104. A larger sized, high resolution image 120 of the woman is presented on the display 106. The images 118, 120 are concurrently presented. For example, if a video showing movements of the woman in the images 118, 120 is presented on the displays 102, 106, then the videos would substantially present the same movements of the woman. The difference would be in the sizes of the presented images 118, 120.

In some embodiments, a discernable amount of time may be required for communication of the emulated display and/or active information, and/or the command and control information, between the mobile media device 104, a media device 122, and/or other components of the media system 108. Further, some amount of time may be required for processing the emulated display and/or active information, and/or the command and control information. Accordingly, the user may perceive some slight delay in the emulation of images and or execution of commands or the like due to the communication times and or processing times.

The exemplary media presentation system 100 comprises the exemplary mobile media device 104, the media system 108, the communication system 114, and/or the exemplary media presentation system 100. The exemplary media system 108 comprises the media device 122, a remote control 124, a visual presentation device 126, and an audio presentation device 128.

Examples of the mobile media device 104 include cell phones, multimedia-enabled smart phones, personal device assistants (PDAs), notepads, netbooks, electronic book readers (e-books), laptop computers and other mobile media devices. These mobile media devices 104 may be characterized as employing a relatively small display 102. In FIG. 1, the exemplary mobile media device 104 corresponds to a cellular phone provisioned with an embodiment of the media presentation system 100.

The display 102 may be used to present information that is received at, and/or communicated out from, the mobile media device 104. Additionally, or alternatively, various operation-related information may be shown using one or more graphic icons 130 or the like on the display 102. For example, but not limited to, exemplary icons 130 may indicate remaining battery life or detected signal strength. When the images presented on the mobile media device 104 are emulated on the display 106, the graphic icons 130 may be optionally presented on the display 106. Since the graphic icons 130 are discretely identifiable, some embodiments may optionally present the graphic icons 130 on different areas of the display 102 and the display 106.

Some embodiments may be configured to permit the user to selectively configure presentation of the emulated image on the display 106. For example, the user may selectively configure presentation of the graphic icons 130 on other locations of the display 106. Alternatively, or additionally, the user may configure the media presentation system 100 to selectively omit presentation of one or more of the graphic icons 130. In an exemplary embodiment, the user may enter display coordinates or the like via a presented menu on the display 106 that is configured to position graphic icons 130 on other locations of the display 106. Alternatively, or additionally, an embodiment may have a touch sensitive screen 106. In such embodiments, the user may touch and drag the presented graphic icons 130 to other locations of the display 106.

Typically, the mobile media device 104 includes a plurality of controllers 132 disposed on one or more surfaces of the mobile media device 104. The controllers 132 are configured to control operation of the mobile media device 104. For example, the controllers 132 may include a plurality of physical or virtual touch sensitive buttons arranged as a number pad so that the user may dial a telephone number such that the mobile media device 104 places a telephone call to another party via the communication system 114.

Similarly, the remote control 124 includes a plurality of controllers 134 on its surface. The controllers 134 are configured to control operation of the media device 122, the visual presentation device 126, and/or the audio presentation device 128. User actuation of the controllers 134 causes the remote control 124 to generate a wireless signal 136, such as an RF signal or an infrared signal, that is received by the media device 122, the visual presentation device 126, and/or the audio presentation device 128. For example, the controllers 134 may include a plurality of physical or virtual touch sensitive buttons arranged as a number pad so that the user may specify a television channel or the like having media content of interest that the user is interested in viewing. Other controllers 134 may be configured to increase and/or decrease output volume of presented audio content.

When the media system 108 is emulating the mobile media device 104, command and control information may be communicated from the mobile media device 104 to control operation of the components of the media system 108. For example, the mobile media device 104 may be configured to communicatively couple to an audio headphone set 138. One or more of the controllers 132 of the mobile media device 104 may be configured to adjust output volume of the audio content emitted from the audio headphone set 138. However, when the media system 108 is emulating the mobile media device 104, command and control information to adjust output volume of the media system 108 may be communicated from the mobile media device 104 to the media system 108 based upon user actuation of the corresponding audio volume controllers 132 residing on the mobile media device 104. That is, the user may adjust audio output volume of the media system 108 using their mobile media device 104.

Conversely, when the media system 108 is emulating the mobile media device 104, command and control information may be communicated from the media system 108 to control operation of the mobile media device 104. For example, one or more of the controllers 134 of the remote control 124 may be configured to turn on or turn off the media device 122, the visual presentation device 126, and/or the audio presentation device 128. In this example, when the media system 108 is emulating the mobile media device 104, command and control information to turn off or turn on the mobile media device 104 may be communicated from the media system 108 to the mobile media device 104 based upon user actuation of the one or more of the controllers 134 residing on the remote control 124. That is, the user may turn on or turn off their mobile media device 104 using the remote control 124. Other functionality of the mobile media device 104 may be similarly controlled using the remote control 124.

Some mobile media device 104 embodiments may be configured with a touch sensitive screen display 102. The touch sensitive display 102 is configured to sense the location of a touch from one or more of the user's fingers, gloves and/or a touch by a stylus, pen, or other object. In some embodiments, one or more virtual touch sensitive controllers 140 may be presented on the touch sensitive display 102 that are configured to control operation of the mobile media device 104. A virtual touch sensitive controller 140 comprises image information that is used to present a selectable image, such as a graphical icon or the like, on the display 102, and information that causes the mobile media device 104 to execute some predefined function. For example, the exemplary virtual touch sensitive controller 140a may be configured to increase output audio volume of the audio headphone set 138. The exemplary virtual touch sensitive controller 140b may be configured to decrease output audio volume of the audio headphone set 138.

When the media system 108 is emulating the mobile media device 104 that has a touch sensitive display 102, command and control information corresponding to touch-based commands input via the touch sensitive display 102 may be communicated from the mobile media device 104 to control operation of the components of the media system 108. In this example, the virtual touch sensitive controllers 140a, 140b are configured to adjust output volume of the audio content emitted from the audio headphone set 138. However, when the media system 108 is emulating the mobile media device 104, command and control information to adjust output volume of the media system 108 may be communicated from the mobile media device 104 to the media system 108 based upon a received user initiated control signal generated as a result of the user's touch of the virtual touch sensitive controllers 140a, 140b presented on the touch sensitive display 102 of the mobile media device 104. That is, the user may adjust audio output volume of the media system 108 by touching the virtual touch sensitive controllers 140a, 140b presented on the touch sensitive display 102 of their mobile media device 104.

In an exemplary embodiment, when the user's touch is detected by the touch sensitive display, the user initiated control signal is sent to the media device 122. The user initiated control signal may, in an exemplary embodiment, include location information identifying a location on the touch sensitive display that the user has touched. The media device 122 compares the touch location information of the user initiated control signal with a known location of the virtual touch sensitive controllers 140a, 140b. If the locations correspond, then it is determined that the user has selected the corresponding one of the virtual touch sensitive controllers 140a, 140b for actuation. The media device 122, in an exemplary embodiment, generates command and control information that is communicated to the mobile media device 104 so that the intended function is effected by the mobile media device 104. Alternatively, or additionally, the touch location information may be directly communicated from the media device 122, or the component operating the touch sensitive display 102, to the mobile media device 104. Based on the received touch location information, the mobile media device 104 determines which function is to be effected.

Some embodiments of the media system 108 may employ a touch sensitive display 106. One or more virtual touch sensitive controllers 140 presented on the display 102 of the mobile media device 104 may optionally be presented on the touch sensitive display 106. For example, the virtual touch sensitive controllers 140a, 140b that are configured to control output volume may be optionally presented on the touch sensitive display 106. When the media system 108 having a touch sensitive display 106 is emulating the mobile media device 104, command and control information corresponding to touch-based commands input via the touch sensitive display 106 may be communicated from the media system 108 to control operation of the mobile media device 104. In this example, the virtual touch sensitive controllers 140a, 140b presented on the touch sensitive display 106 may be touched by the user to adjust output volume of the audio content emitted from the audio headphone set 138.

In the various embodiments, the mobile media device 104 is configured to communicate directly with one or more components of the media system 108. In an exemplary embodiment, the mobile media device 104 communicates directly with the media device 122 via a wireless signal 142. Alternatively, or additionally, the wireless signal 142 may be communicated with other components of the media system 108. The wireless signal 142 may use any suitable communication medium, such as, but not limited to, an RF medium or an infrared medium.

Alternatively, or additionally, the mobile media device 104 may communicate with the media device 122 via a physical connection 144 that is configured to communicate wire-based signals. The physical connection 144 may use any suitable wire-based communication medium, such as, a uniform serial bus (USB) connection, a LAN connection, an Ethernet connection, a cable connection, or the like. Alternatively, or additionally, the physical connection 144 may be established with other components of the media system 108.

Alternatively, or additionally, the media device 122 may communicate with the mobile media device 104 via the exemplary communication system 114. The media device 122 is configured to communicate using a wireless signal 146 (e.g.: RF cellular signals or Wi-Fi signals) and/or wire-based signals over connector 148. For example, but not limited to, the media device 122 may communicate with the mobile media device 104 using a cellular telephone system portion or a Wi-Fi portion of the communication system 114. Alternatively, or additionally, the wireless signal 146 and/or wire-based signals over the wire connector 148 may be communicated from other components of the media system 108.

The exemplary communication system 114 is illustrated as a generic communication system. In one embodiment, the communication system 114 comprises a cellular telephone system, such as a radio frequency (RF) wireless system. Accordingly, the mobile media device 104 and or the media device 122 includes a suitable transceiver. Alternatively, the communication system 114 may be a wire-based telephony system, the Internet, a Wi-Fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, mobile media device 104 embodiments may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, mobile media device 104 and/or media device 122 embodiments may be configured to communicate over combination systems having a plurality of segments which employ different formats for each segment that employ different technologies on each segment.

The exemplary media system 108 includes the media device 122, the visual presentation device 126, and/or the audio presentation device 128. Non-limiting examples of the visual presentation device 126 include televisions, monitors, personal computers, laptop computers or other electronic devices that include, or are coupled to, the relatively large display 106. Some visual presentation devices 126 may optionally include speakers (not shown) that emit the audio portions of received media content 150. Non-limiting examples of the audio presentation device 128 include surround sound receivers, stereos, radios or other electronic devices that include, or are coupled to, one or more speakers 152.

Figure 2:
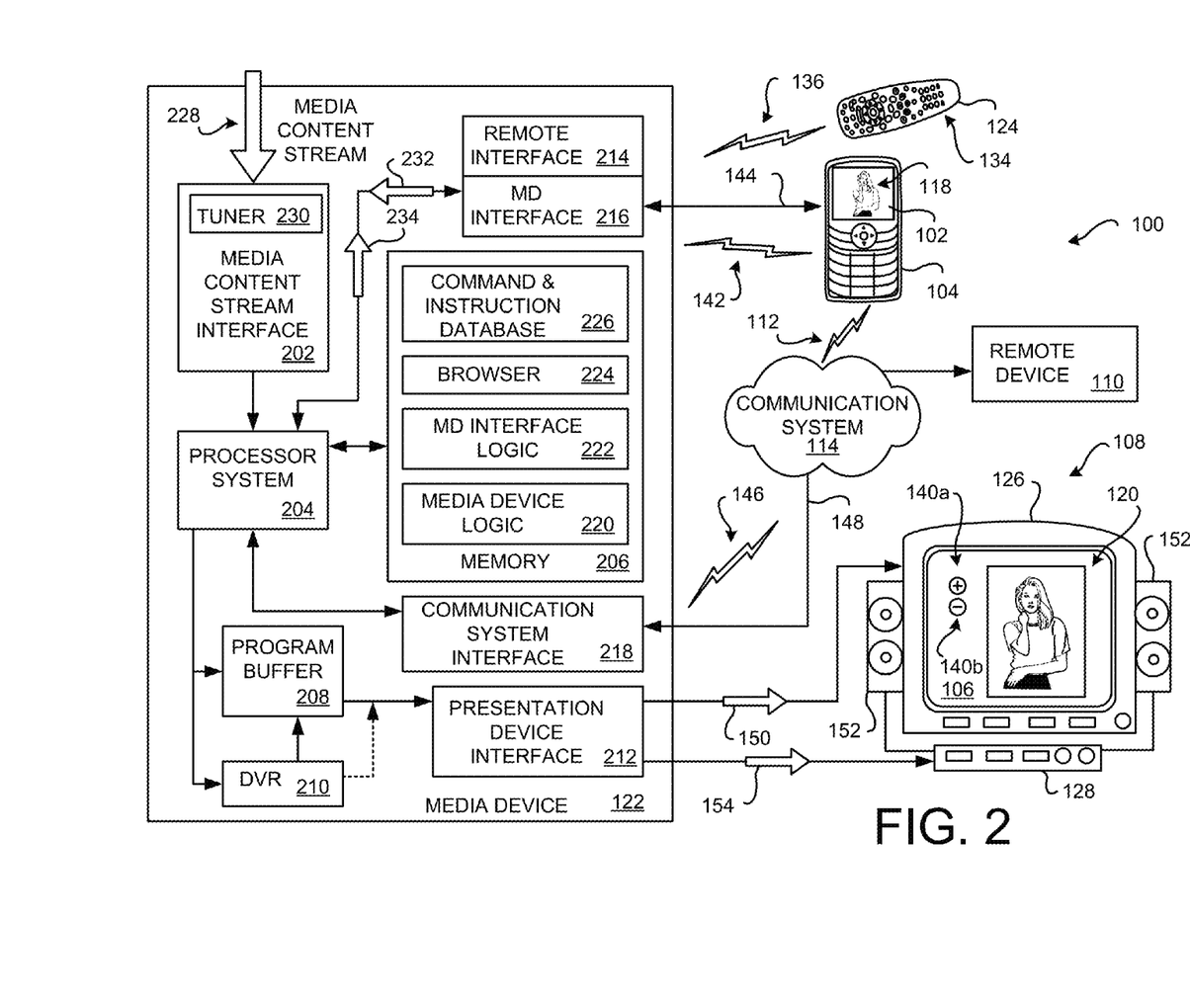
FIG. 2 is a block diagram of an embodiment of the media presentation system implemented in an exemplary media device.

FIG. 2 is a block diagram of an embodiment of the media presentation system 100 implemented in an exemplary media device 122. Examples of the media device 122 include, but are not limited to, a set top box (STB). Embodiments of the media presentation system 100 may be implemented in other media devices, such as, but not limited to, a stereo, a surround-sound receiver, a radio, a television (TV), a digital video disc (DVD) player, a digital video recorder (DVR), a game playing device, or a personal computer (PC).

The non-limiting exemplary media device 122 comprises a media content stream interface 202, a processor system 204, a memory 206, a program buffer 208, an optional digital video recorder (DVR) 210, a presentation device interface 212, a remote interface 214, an optional mobile device (MD) interface 216, and an optional communication system interface 218. The memory 206 comprises portions for storing the media device logic 220, the media device (MD) interface logic 222, an optional browser 224, and a command and instruction database 226. In some embodiments, the media device logic 220, the media device (MD) interface logic 222, and/or the optional browser 224 may be integrated together, and/or may be integrated with other logic. In other embodiments, some or all of these memory and other data manipulation functions may be provided by using a remote server or other electronic devices suitably connected via the Internet or otherwise to a client device. Other embodiments of the media device 122 may include some, or may omit some, of the above-described media processing components. Further, additional components not described herein may be included in alternative embodiments.

The functionality of the media device 122, here a set top box, is now broadly described. A media content provider provides media content that is received in one or more multiple media content streams 228 multiplexed together in one or more transport channels or the like. The transport channels with the media content streams 228 are communicated to the media device 122 from a media system sourced from a remote head end facility (not shown) operated by the media content provider. Non-limiting examples of such media systems include satellite systems, cable systems, and the Internet. For example, if the media content provider provides programming via a satellite-based communication system, the media device 122 is configured to receive one or more broadcasted satellite signals detected by an antenna (not shown). Alternatively, or additionally, the media content stream 228 can be received from one or more different sources, such as, but not limited to, a cable system, a radio frequency (RF) communication system, or the Internet.

The one or more media content streams 228 are received by the media content stream interface 202. One or more tuners 230 in the media content stream interface 202 selectively tune to one of the media content streams 228 in accordance with instructions received from the processor system 204. The processor system 204, executing the media device logic 220 and based upon a request for a media content event of interest specified by a user (not shown), parses out media content associated with the media content event of interest. The media content event of interest is then assembled into a stream of video and/or audio information which may be stored by the program buffer 208 such that the media content can be streamed out to the media presentation device, such as the visual presentation device 126 and/or the audio presentation device 128, via the presentation device interface 212. Alternatively, or additionally, the parsed out media content may be saved into the DVR 210 for later presentation. The DVR 210 may be directly provided in, locally connected to, or remotely connected to, the media device 122.

In this simplified embodiment, the presentation device interface 212 is illustrated as coupled to a media system 108 that includes the visual presentation device 126, such as a television (hereafter, generically a TV), and the audio presentation device 128, such as a surround sound receiver. Other types of output devices may also be coupled to the media device 122, including those providing any sort of stimuli sensible by a human being, such as temperature, vibration and the like. The video portion of the streamed media content is displayed on the display 106 and the audio portion of the streamed media content is reproduced as sounds by the speakers 152.

The above processes performed by the media device 122 are generally implemented by the processor system 204 while executing the media device logic 220. Thus, the media device 122 may perform a variety of functions related to the processing and presentation of one or more media content events received in the media content stream 228.

The mobile device interface 216 is configured to receive communications from the mobile media device 104. The received information is used by the processor system 204 to operate the media device 122 and/or the components of the media system 108. In particular, based on the emulated display information received from the mobile media device 104, the processor system 204 configures the emulated display information for presentation on the larger display 106 that is substantially the same as, or even identical to, the relatively smaller displayed information presented on the display 102 of the mobile media device 104. Additionally or alternatively, the processor system 204 configures the command and control information such that operation of one or more of the components of the media system 108 are controlled in accordance with the received command and control information.

In an exemplary embodiment, the mobile device interface 216 is configured to receive the wireless signal 142 transmitted from the mobile media device 104. The wireless signal 142 may use any suitable communication medium, such as, but not limited to, an RF medium or an infrared medium. Accordingly, the mobile device interface 216 comprises one or more suitable RF or infrared transceivers (not shown) that are configured to receive the emulated display and/or active information (conceptually illustrated by the arrow 232) via the wireless signal 142. Further, the one or more wireless transceivers are configured to communicate command and control information (conceptually illustrated by the arrow 234) generated by the processor system 204 back to the mobile media device 104.

Alternatively, or additionally, the mobile device interface 216 may be configured to communicate with the media device 122 via the physical connection 144 using wire-based signals. Accordingly, the mobile device interface 216 comprises one or more suitable transceivers (not shown) that are configured to receive the wire-based signals. Further, the one or more transceivers are configured to communicate command and control information generated by the processor system 204 back to the mobile media device 104.

As described herein, a user (not shown) may view and listed to various program content when presented on the exemplary visual presentation device 126 and/or the exemplary audio presentation device 128. That is, based upon the user commands, typically generated at and transmitted from the remote control 124 as a wireless signal 136 that is received by the remote interface 214, the media device 122 can then control itself and/or other various media devices that it is communicatively coupled to. Accordingly, available program content is presented in accordance with the generated user commands.

In an exemplary embodiment, the remote interface 214 is configured to receive the wireless signal 136 transmitted from the remote control 124. The wireless signal 136 may use any suitable communication medium, such as, but not limited to, an RF medium or an infrared medium. Accordingly, the remote interface 214 comprises one or more suitable RF or infrared transceivers (not shown) that are configured to receive the wireless signal 136.

In some embodiments, the mobile device interface 216 and the remote interface 214 may be an integrated device or a single device. For example, but not limited to, the integrated interface may be configured to receive RF signals from either the remote control 124 or the mobile media device 104. Alternatively, or additionally, the integrated interface may be configured to receive infrared signals from either the remote control 124 or the mobile media device 104.

The emulated display and/or active information, and/or the command and control information, (conceptually illustrated by the arrows 232, 234) received from the mobile media device 104 is processed by the processor system 204 executing the media device interface logic 222. Further, when information is received from the remote control 124 or one of the components of the media system 108, the processor system 204 is configured to generate corresponding command and control information that is communicated to the mobile media device 104. Such command and control information (conceptually illustrated by the arrow 234) is generated by the processor system 204 executing the media device interface logic 222.

In some embodiments, the emulated display and/or active information, and/or the command and control information, received from the mobile media device 104 comprises information that is used to present graphical icon information and/or active links (e.g.; hypertext links, hyper links, uniform resource locators, etc.) on the large display 106. Selection of the presented graphical icon information or active links by the user causes the processor system 204 to use the browser 224 to access the remote device 110, via the communication system 114, to perform various functions. For example, information corresponding to the visual information presented on the display 102 of the mobile media device 104 may be retrieved from the remote device 110 and presented on the display 106.

In such embodiments, the communication system interface 218 is configured to receive and/or transmit the wireless signal 146. Accordingly, the communication system interface 218 may be configured to receive and/or transmit the wireless signals via the communication system 114. Alternatively, or additionally, the communication system interface 218 may be configured to communicate with the remote device 110 via the physical connection 144 using wire-based signals. Accordingly, the communication system interface 218 comprises one or more suitable transceivers (not shown) that are configured to receive the wire-based signals. For example, but not limited to, an embodiment may employ a suitable Wi-Fi enabled modem or the like to access the Internet.

In the various embodiments, the media device 122 and/or the components of the media system 108 are configured to respond to command and control information received from the mobile media device 104. Further, the mobile media device 104 is configured to respond to command and control information received from the media device 122 and/or the components of the media system 108. In an exemplary embodiment, such command and control information is processed by the processor system 204 executing the media device interface logic 222. The command and control information may be based on information that is optionally stored in the command and instruction database 226.

During an initialization process, when the mobile media device 104 and the media device 122 and/or the components of the media system 108 begin to establish communications with each other, a predefined set of command and control information instructions may be identified in the command and instruction database 226, and/or may be defined and stored into the command and instruction database 226. In some embodiments, a plurality of different command and control information sets may be defined and/or stored for a plurality of different types of mobile media devices 104. For example, the user may have a cellular phone that is of a different manufacturer, and/or of a different make or model, from a smart phone device also owned by the user. When the user is emulating information presented on their cellular phone on the display 106 of the visual presentation device 126, the command and control information set configured to support command and control information communicated with that particular cellular phone may be readily available from the command and instruction database 226. Similarly, when the user is emulating information presented on their smart phone device on the display 106, the command and control information set configured to support command and control information communicated with that particular smart phone device may be readily available from the command and instruction database 226. In an exemplary embodiment, the various command and control information sets may be predefined and stored into the command and instruction database 226. Alternatively, a command and control information set for a particular mobile media device 104 may be communicated to the media device 122 and stored in the command and instruction database 226 during the initialization process.

Additionally, or alternatively, a predefined set of command and control information instructions may be identified in the command and instruction database 226, and/or may be defined and stored into the command and instruction database 226, that correspond to the controllers 134 on the remote control 124. For example, one of the controllers 134 may be associated with a zoom-in function that increases the size of the emulated image presented on the display 106 of the media system 108. Another controller 124 may be associated with a zoom-out function that decreases the size of the emulated image presented on the display 106. Any suitable functions associated with operation of the mobile media device 104 may be defined for the controllers 134 of the remote control 124.

In the various embodiments, the display 106 is configured as a touch sensitive display. In an exemplary embodiment, touch information sensed by the touch sensitive display 106 is processed by the processor system 204 or another processor system residing in components of the media system 108. The touch information sensed at the touch sensitive display 106 is used to generate command and control information that is communicated to the mobile media device 104.

Figure 3:
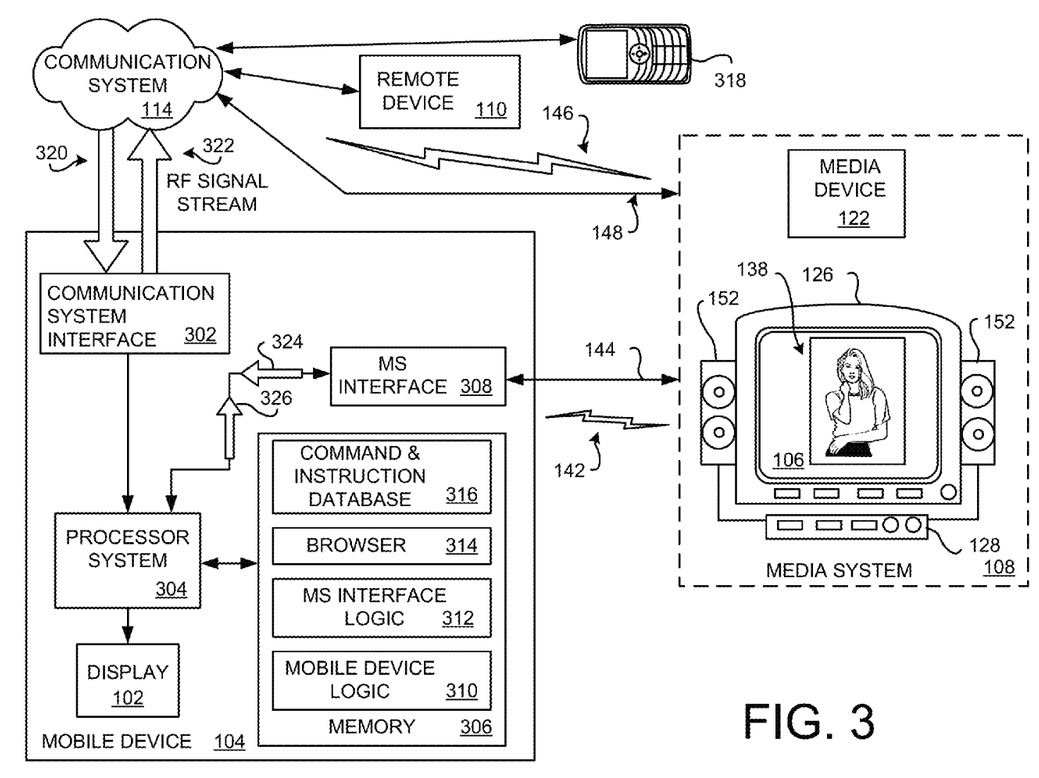
FIG. 3 is a block diagram of an embodiment of the media presentation system implemented in an exemplary mobile media device.

FIG. 3 is a block diagram of an embodiment of the media presentation system 100 implemented in an exemplary mobile media device 104. Embodiments of the media presentation system 100 may be implemented in other mobile media devices 104, such as, but not limited to, cell phones, multimedia-enabled smart phones, personal device assistants (PDAs), notepads, netbooks, electronic book readers (e-books), laptop computers and other mobile media devices.

The non-limiting exemplary mobile media device 104 comprises the display 102, a communication system interface 302, a processor system 304, a memory 306, and an optional media system (MS) interface 308. The memory 306 comprises portions for storing the mobile device logic 310, the media system (MS) interface logic 312, an optional browser 314, and a command and instruction database 316. In some embodiments, the mobile device logic 310, the media system (MS) interface logic 312, and/or the optional browser 314 may be integrated together, and/or may be integrated with other logic. In other embodiments, some or all of these memory and other data manipulation functions may be provided by using remote servers or other electronic devices suitably connected via the Internet or otherwise connected to a client device. Other embodiments of the mobile media device 104 may include some, or may omit some, of the above-described media processing components. Further, additional components not described herein may be included in alternative embodiments.

The functionality of the mobile media device 104, here a cellular phone or smart phone, is now broadly described. Communications with other devices, such as, but not limited to the exemplary mobile media device 318, are established over the communication system 114. For example, an incoming RF signal stream 320 may correspond to audio information (such as a phone call established with another user of a remote mobile media device 318, a land-line phone, or the like), may correspond to one or more still images (such as when a photograph is received from the user of the other remote mobile media device 318), or a video clip (such as when a movie is received from the user of the other remote mobile media device 318 or the remote device 110). Image information in the incoming RF signal stream 320 is presented on the display 102.

Similarly, the mobile media device 104 may communicate an outgoing RF signal stream 322 to the remote mobile media device 318 and/or the remote device 110. The outgoing RF signal stream 322 may correspond to audio information, one or more still images, or a video clip. In some situations, image information in the outgoing RF signal stream 322 may be presented on the display 102.

The communication processes performed by the mobile media device 104 are generally implemented by the processor system 304 while executing the mobile device logic 310. Thus, the mobile media device 104 may perform a variety of functions related to the processing and communication of the incoming RF signal stream 320 and the outgoing RF signal stream 322.

In this simplified embodiment, the media system interface 308 is communicatively coupled to the media device 122 and/or components of the media system 108. The media system interface 308 is configured to receive information corresponding to the received communications from the media device 122 and/or components of the media system 108. In an exemplary embodiment, the processor system 304 configures the emulated display information for presentation on the larger display 106 that is substantially the same as, or even identical to, the relatively smaller displayed information presented on the display 102 of the mobile media device 104. Additionally, or alternatively, the processor system 304 configures the command and control information received from or communicated to the media device 122 and/or components of the media system 108.

In an exemplary embodiment, the media system interface 308 is configured to receive the wireless signal 142. The wireless signal 142 may use any suitable communication medium, such as, but not limited to, an RF medium or an infrared medium. Accordingly, the media system interface 308 comprises one or more suitable RF or infrared transceivers (not shown) that are configured to receive the command and control information (conceptually illustrated by the arrow 324) via the wireless signal 142. Further, the one or more wireless transceivers are configured to communicate the emulated display and/or active information, and/or the command and control information, (conceptually illustrated by the arrow 326) to the media device 122 and/or components of the media system 108.

In some embodiments, the communication system interface 302 and the media system interface 308 may be an integrated device or a single device. For example, but not limited to, the integrated interface may be configured to receive RF signals from either the communication system 114, the media device 122, and/or components of the media system 108.

The emulated display and/or active information, and/or command and control information, (conceptually illustrated by the arrow 324) communicated to the media device 122 and/or components of the media system 108 is processed by the processor system 304 executing the media system interface logic 312. Further, when command and control information is received from the media device 122 and/or components of the media system 108, the processor system 304 is configured to operate the mobile media device 104 in accordance with the received command and control information.

In some embodiments, the emulated active information, and/or command and control information, communicated from the mobile media device 104 comprises information that is used to present graphical icon information, and/or active links (e.g.; hypertext links, hyper links, uniform resource locators, etc.) on the large display 106. When the presented graphical icon information is selected by the user, corresponding command and control information is received by the mobile media device 104. The received command and control information then causes the processor system 304 to use the browser 314 to access the remote device 110, via the communication system 114, to perform various functions.

In the various embodiments, the mobile media device 104 is configured to generate and/or to respond to command and control information. In an exemplary embodiment, such command and control information is processed by the processor system 304 executing the media system interface logic 312. The command and control information may be based on information that may be optionally stored in the command and instruction database 316.

During an initialization process, when the mobile media device 104 and the media device 122 and/or the components of the media system 108 begin to establish communications with each other, a predefined set of command and control information instructions may be identified in the command and instruction database 316, and/or may be defined as stored into the command and instruction database 316. For example, a plurality of different command and control information sets may be defined and/or stored for a plurality of different types of media devices 122 and/or components of the media system 108. In an exemplary embodiment, the various command and control information sets may be predefined and stored into the command and instruction database 316. Alternatively, a command and control information set for the mobile media device 104 may be received from the media device 122 and stored in the command and instruction database 316 during the initialization process.

Figure 4A:
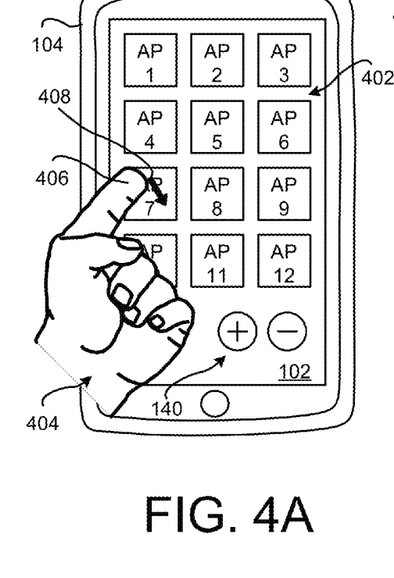
FIGS. 4A and 4B conceptually illustrate concurrent operation of a mobile media device and an exemplary visual presentation device having touch sensitive displays.

FIGS. 4A and 4B conceptually illustrate concurrent operation of a mobile media device 104 and an exemplary visual presentation device 126 having touch sensitive displays 102, 106, respectively. In FIG. 4A, the exemplary mobile media device 104 presents a plurality of selectable graphical icons 402 corresponding to applications ("apps") on the touch sensitive display 102. A user's hand 404 is conceptually illustrated with the index finger 406 extended over the exemplary seventh selectable graphical icon (AP 7). When the user moves their index finger 406 in a downward direction, conceptually indicated by the downward pointing arrow 408, and eventually touches the touch sensitive display 102 at a location where the exemplary seventh selectable graphical icon (AP 7) is presented, the mobile media device 104 accesses and executes an application associated with the exemplary seventh selectable graphical icon (AP 7).

When an embodiment of the media presentation system 100 is emulating the plurality of graphical icons 402 on the display 102 of the mobile media device 104, an image 410 of the mobile media device 104 is concurrently presented on the display 106. Further, the corresponding graphical icons 402 are concurrently presented on the relatively larger display 406, as conceptually illustrated in FIG. 4B. Thus, each of the graphical icons 402 presented on the display 106 are larger than the corresponding graphical icons 402 presented on the display 102 of the mobile media device 104. As the display 102 of the mobile media device 104 changes to present images of the executing application associated with the touched seventh selectable graphical icon (AP 7), corresponding images are presented on the display 406. Since the images are larger when presented on the display 106, the user is able to better discern the presented images.

In some embodiments, the display 106 is also a touch sensitive display. When the graphical icons 402 are presented on the touch sensitive display 106, the user may select and activate applications associated with the graphical icons 402 presented on the touch sensitive display 106. For example, FIG. 4B conceptually illustrates the index finger 406 of the user's hand 404 oriented above the presented seventh selectable graphical icon (AP 7). When the user moves their index finger in a downward motion, as conceptually illustrated by the downward pointing arrow 412, so as to touch the exemplary seventh selectable graphical icon (AP 7), command and instruction information is generated and communicated to the mobile media device 104. Upon receiving the command and instruction information, the mobile media device 104 access and executes the corresponding application associated with the seventh selectable graphical icon (AP 7).

Figure 4B:
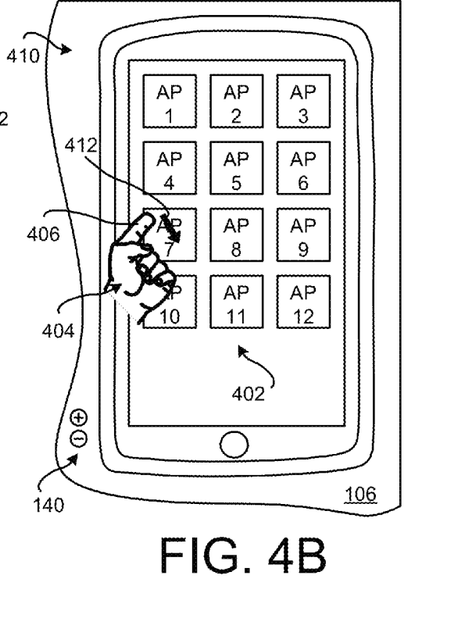

Further, as the mobile media device 104 executes the application, images associated with the executing application are presented on the display 102 of the mobile media device 104. In an exemplary embodiment, the mobile media device 104 generates and communicates emulated information that is concurrently presented on the display 106 of the media system 108.

Alternatively, the mobile media device 104 may communicate command and instruction information to the media device 122 that causes the media device 122 to access the remote device 110 so as to concurrently execute the corresponding application. Accordingly, both the mobile media device 104 and the media device 122 access and operate the accessed application in a concurrent manner such that images presented on the display 102 of the mobile media device 104 correspond to concurrently presented images on the display 106 of the media system 108. In the various embodiments, the user may control operation of the application from the mobile media device 104 (by touching the touch sensitive display 102) or may control operation of the application from the media system 108 (by touching the touch sensitive display 106).

In practice, when the user touches a particular location on the touch sensitive display 106 of the media system 108, touch location information is generated and communicated to the media device 122. The media device 122, based upon the received touch location information that identifies the location of the user's touch on the display 106, generates command and instruction information that is communicated to the mobile media device 104. Based on the received command and instruction information, the mobile media device 104 can determine a corresponding touch location on its display 102. Accordingly, the mobile media device 104 may then determine a corresponding command or instruction to control operation of the executing application. That is, the touch location information determined from the touch sensitive display 106 of the media system 108 is emulated by the mobile media device 104 so that, for all practical purposes, the user's touch to the touch sensitive display 106 of the media system 108 causes the same operation as if the user had touched a corresponding location on the display 102 of the mobile media device 104. Accordingly, the user may effectively operate the functions of the mobile media device 104 by touching the larger graphical icons 402 that are presented on the touch sensitive display 106 of the media system 108.

The touch location information that identifies the user's touch location may be based on any suitable coordinate system. For example, the user's touch of the exemplary seventh selectable graphical icon (AP 7) presented on the touch sensitive display 106 of the media system 108 may be determined using an x-y coordinate system. The x-axis and y-axis coordinates of the user's touch is communicated to the media device 122. This information is used to generate command and instruction information that is communicated to the mobile media device 104. The mobile media device 104 determines corresponding x-axis and y-axis information (or coordinate information that corresponds to the particular coordinate system used by the mobile media device 104) for its display 102. That is, the mobile media device 104 maps the user's touch to the touch sensitive display 106 of the media system 108 to its display 102.

Embodiments may be configured to use any suitable coordinate system to determine touch location information. Further, the coordinate system used by the mobile media device 104 may be different from the coordinate of the touch sensitive display 106 of the media system 108. For example, but not limited to, the touch sensitive display 106 of the media system 108 may employ an x-y axis coordinate system and the mobile media device 104 may employ a polar coordinate system. Any suitable coordinate system mapping algorithm may be used by the various embodiments.

Mapping translation information used to map the touch location information between the touch sensitive display 106 of the media system 108 and the mobile media device 104 may reside in the command and instruction database 226 of the memory 206 of the media device 122. Accordingly, the media device 122 may determine the corresponding touch location on the display 102 of the mobile media device 104.

Alternatively, or additionally, mapping translation information used to map the touch location information between the touch sensitive display 106 of the media system 108 and the mobile media device 104 may reside in the command and instruction database 316 of the memory 306 of the mobile media device 104. Accordingly, the mobile media device 104 may determine the corresponding touch location on its display 102.

In some embodiments, one or more virtual touch sensitive controllers 140 may be presented on the touch sensitive display 102 that are configured to control operation of the mobile media device 104. The virtual touch sensitive controllers 140 may also be emulated and presented on the touch sensitive display 106 of the media system 108. However, the presentation location of the emulated virtual touch sensitive controllers 140 presented on the display 106 may be different from the presentation location of the virtual touch sensitive controllers 140 on the display 102 of the mobile media device 104. The mapping between the emulated virtual touch sensitive controllers 140 presented on the display 106 and the presentation location of the virtual touch sensitive controllers 140 on the display 102 may be accounted for using a suitable location translation value or factor.

When the display 102 of the mobile media device 104 is touch sensitive, and/or when the display 106 of the media system 108 is touch sensitive, a variety of touch based commands may be mapped so as to generate command and instruction information that controls either the mobile media device 104, the media device 122, and/or components of the media system 108. That is, a variety of touch based gestures by the user's hand 404 may be used to control the mobile media device 104, control the media device 122, and/or control components of the media system 108.

Exemplary user initiated gestures, or touch commands, include tap and double tap actions (corresponding to a mouse left click or left double click), panning commands (for dragging parts of a presented page), panning with inertia commands (for dragging parts of a presented page at transition rates that correspond to the speed and/or inertia of the dragging touch), press and tap with a second finger commands (corresponding to a mouse right click), zoom increase or decrease commands (that changes the size of a presented image), rotate commands (which rotate an image clockwise or counter clockwise), two-finger taps commands, press and hold commands, and/or flick commands. User touches are processed to determine the intended gesture command. The identified gesture command may be used to map commands between the mobile media device 104, the media device 122, and/or components of the media system 108. Any suitable user initiated gesture command may be used.

Figure 5A:
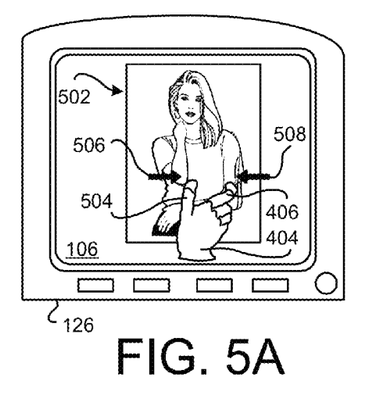
FIGS. 5A and 5B conceptually illustrate a decrease zoom gesture command implemented on the touch sensitive display of the exemplary visual presentation device.
Figure 5B:
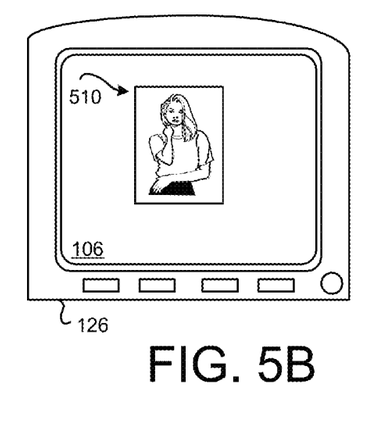

FIGS. 5A and 5B conceptually illustrate a decrease zoom gesture command implemented on the touch sensitive display 106 of the exemplary visual presentation device 126 that is concurrently implemented on the display 102 of the mobile media device 104. Here, the image 502 presents a relatively large sized image of the woman. Concurrently, a corresponding image of the woman is presented on the display 102 of the mobile media device 104 (not shown). To decrease the size of the image 502 of the woman presented on the display 102 of the mobile media device 104, the user may use a reduce zoom gesture by touching the touch sensitive display 106 of the media system 108. Here, the index finger 406 and the thumb 504 of the user's hand 404 (generically, digits 406, 504) are touched onto the touch sensitive display 106 of the media system 108, and are then moved towards each other in a sweeping motion, as conceptually indicated by the opposing arrows 506, 508. In response, a smaller sized image 510 of the woman is presented on the touch sensitive display 106 of the media system 108.

Concurrently with presentation of the smaller sized image 510 of the woman presented on the touch sensitive display 106 of the media system 108, command and instruction information is communicated to the mobile media device 104 that indicates the touch location information corresponding to the dual touch of the user's thumb 504 and index finger 406. The mobile media device 104 then maps the touch information to identify corresponding locations on its display 102. Further, the command and instruction information communicated to the media device 122 indicates the relative movement of the user's thumb 504 and index finger 406 while touching the display 106. The mobile media device 104 then maps the corresponding relative movement to its display. In response to receiving the command and instruction information, the size of the image of the woman presented on the display 102 of the mobile media device 104 (not shown) decreases by a corresponding amount. That is, the user may decrease the size of an image (or a presented video, presented text, and/or presented graphic icons) presented on the display 102 of the mobile media device 104 by implementing a zoom reduction gesture onto the touch sensitive display 106 of the media system 108.

Alternatively, or additionally, the media device 122 may determine command and control information that is communicated to the mobile media device 104. For example, in the situation of the zoom reduction gesture to reduce the size of the image 502 to the smaller image 510, the media device 122 may determine a percentage size of image reduction or the like, and then communicate the percentage change in image size to the mobile media device 104 using command and control information.

Conversely, the user may decrease the size of the image of the woman presented on the display 102 of the mobile media device 104 by implementing a zoom reduction gesture onto the touch sensitive display 102 of the mobile media device 104. In this situation, the touches of the user's digits are mapped from the touch sensitive display 102 of the mobile media device 104 such that command and instruction information is communicated to the media device 122 and/or components of the media system 108 to reduce the size of the image of the woman presented on the touch sensitive display 106 of the media system 108. Alternatively, emulated display information may communicated to the media device 122 and/or components of the media system 108 to reduce the size of the image of the woman presented on the touch sensitive display 106.

Alternatively, or additionally, the mobile media device 104 may determine command and control information that is communicated to the media device 122. For example, in the situation of the zoom reduction gesture made on the display 102 of the mobile media device 104 to reduce the size of the image 502 to the smaller image 510, the mobile media device 104 may determine a percentage size of image reduction or the like, and then communicate the percentage change in image size to the media device 122 using command and control information. Or, a reduced sized image may be determined by the mobile media device 104 and then communicated to the media device 122 as emulated display information.

Figure 6:
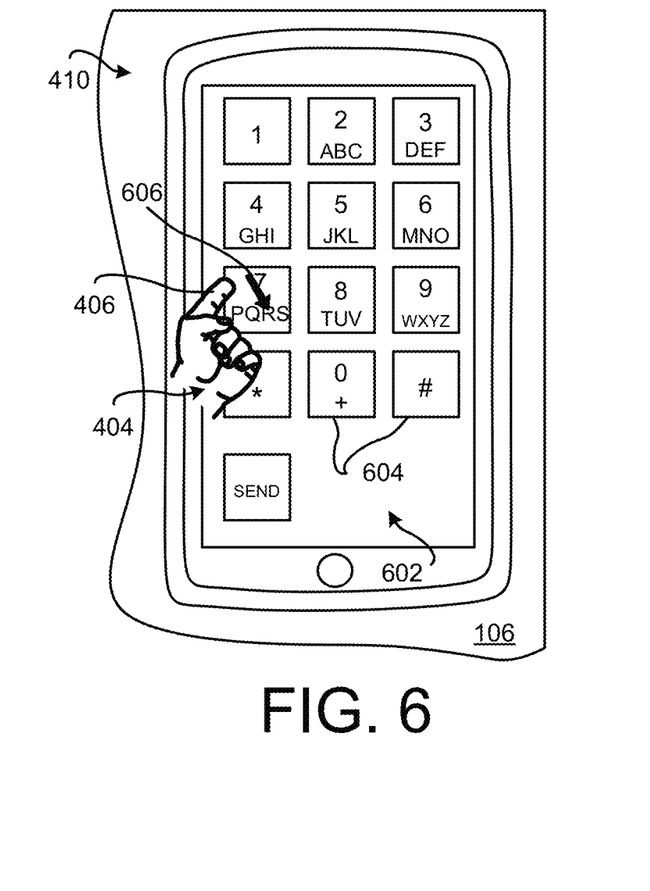
FIG. 6 conceptually illustrates a virtual key pad presented on the touch sensitive display of the exemplary visual presentation device.

FIG. 6 conceptually illustrates a virtual key pad 602 presented on the touch sensitive display 106 of the exemplary visual presentation device 126. In this embodiment, the mobile media device 104 communicates emulated information to the media device 122 and/or to other components of the media system 108 corresponding to a plurality of touch sensitive graphic icons 604 that are configured to be arranged in the exemplary virtual key pad 602. (Alternatively, the mobile media device may request the media device 122 and/or to other components of the media system 108 to present the virtual key pad 602 on the touch sensitive display 106).

The user may sequentially touch the presented touch sensitive graphic icons 604 of the virtual key pad 602 in a manner that corresponds to a telephone number. For example, a user's hand 404 is conceptually illustrated with the index finger 406 extended over the exemplary touch sensitive graphic icons corresponding to the numeral seven ("7"). When the user moves their index finger 406 in a downward direction, conceptually indicated by the downward pointing arrow 606, and eventually touches the touch sensitive display 106 at a location where the exemplary touch sensitive graphical icon is presented, the media device receives information indicating that the user has selected the number seven. In one embodiment, the location of the touch is incorporated into command and control information that is communicated to the mobile media device 104. In other embodiments, the media device 122 determines that the number seven has been selected, and then communicates command and control information corresponding to the selected number seven.

Accordingly, command and control information corresponding to the telephone number is then communicated to the mobile media device 104, wherein the command and control information is configured to cause the mobile media device 104 to place a telephone call to a remote device (not shown) associated with the telephone number. The mobile media device 104 then places a telephone call to a remote device associated with the telephone number.

Further, the virtual key pad 602 may be used for text messaging. An alternative embodiment may present a virtual key pad 602 that resembles another input device. For example, but not limited to, the virtual key pad 602 may resemble an alphanumeric key board such as those used by a computer or typewriter. The virtual key pad 602 may be presented in any manner with any suitable number of touch sensitive graphic icons 604.

Embodiments of the media presentation system 100 may be configured to operate in a mirror image mode wherein the images presented on the display 102 of the mobile media device 104 are exactly, or substantially exactly, emulated by the display 106 of the media system 108. That is, other that presentation size of the image on the displays 102, 106, the images are identical or substantially identical.

Alternatively, embodiments of the media presentation system 100 may be configured to operate in an enhanced image mode wherein an additional image is presented on the display 106 of the media system 108. For example, the display 102 of the mobile media device 104 may not be sufficiently large enough to present the entirety of a web page or the like accessed from the remote device 110. However, the entirety of the web page or the like may be presented on the display 106 of the media system 108.

Other information of interest may also be optionally presented on the display 106 of the media system 108. For example, but not limited to, a media content event may be concurrently presented on the display 106 of the media system 108. For example, a picture in picture (PIP), picture over picture (POP), or split screen format, may be used to concurrently present the media content event and the emulation of the mobile media device 104. For example, the user may watch a movie on the display 106 of the media system 108 while responding to a telephone call that is being received on their mobile media device 104 that is being emulated on the display 106.

Some embodiments of the media presentation system 100 are configured to present a graphical user interface (GUI), such as a menu driven interface or the like, on the display 106 of the media system 108. The user may use the controllers 134 on the remote control 124 to navigate about the presented GUI so as to control operation of their mobile media device 104. For example, the presented GUI may represent a key pad with graphical icons corresponding to numerals. Here, the user may navigate about the numbers so as to dial a telephone number. In response to the user's input via the presented GUI, command and instruction information may be communicate to the mobile media device 104 so that the mobile media device 104 dials the telephone number and places a telephone call. If the display 106 of the media system 108 is touch sensitive, the user may simply touch the virtual touch sensitive controllers 140 to cause the mobile media device 104 to place the telephone call.

Some embodiments of the components of the media system 108 may be Internet enabled and configured to move a presented pointer or the like about the display 106 of the media system 108. An interactive GUI may be presented on the display 106 that is responsive to the user's input made via the presented pointer.

In the various embodiments, emulated display information may comprise image data that may be used to render an image on the displays 102, 106. That is, the emulated information corresponds to at least one image that is being currently presented on a display 102 of the mobile media device 104. The image data may be configured to render a video or a still image. Any suitable data format may be used. For example, moving pictures expert group (MPEG) formats may be used for video information. Still image data may use the joint photographic experts group (JPEG) format, graphics interchange format (GIF), or any other suitable still image format.

In the various embodiments, the emulated active information may be a combination of text and/or graphics that is user selectable. For example, one from of the emulated active information may be a hyper text markup language (html) link that is represented textually on the displays 102, 106. As another non-limiting example, the emulated active information may be a selectable button or the like presented on the displays 102, 106.

In the various embodiments, the command and control information is alphanumeric (textual) based information that may be formatted using any suitable command language format. For example, the command and control information configured using computer code commands, such as Fortran or another programming language. Further, the command and control information may be configured to emulate commands in the native language of the mobile media device 104.

It should be emphasized that the above-described embodiments of the media presentation system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device, comprising:
   a media content stream interface configured to receive at least one media content stream broadcasted to the media device by a media content provider, wherein the at least one media content stream includes a media content event that is selectable for presentation on a first display that is communicatively coupled to the media device;
   a mobile device interface configured to:
      communicatively couple the media device to a mobile media device; and
      receive emulated information from the mobile media device via a first communication link established between the mobile media device and the media device,
      wherein the emulated information corresponds to a low resolution image that is being currently presented on a second display of the mobile media device,
      wherein the emulated information includes information that causes the media device to access at least one high resolution image from a remote device via a second communication link established between the media device and the remote device, and
      wherein the second communication link is different from the first communication link; and
   a processor system communicatively coupled to the media content stream interface and the mobile device interface, and configured to:
      receive high resolution image data from the remote device via the second communication link, wherein the received high resolution image data includes sufficient data to generate the at least one high resolution image;
      generate the at least one high resolution image based on the high resolution image data received from the remote device; and
      communicate the at least one high resolution image to the first display,
   wherein the at least one high resolution image is presented on the first display.

2. The media device of claim 1, wherein the at least one high resolution image is substantially the same as the low resolution image presented on the second display of the mobile media device.

3. The media device of claim 1, further comprising:
   a presentation device interface communicatively coupled to the processor system and configured to communicatively couple the media device to the first display,
   wherein the first display is a component of a visual presentation device, and
   wherein the at least one high resolution image is communicated from the media device to the first display via the presentation device interface.

4. The media device of claim 1, further comprising:
a communication system interface communicatively coupled to the processor system and configured to communicatively couple the media device to a communication system that the remote device is communicatively coupled to,
wherein at least a portion of the second communication link established between the media device and the remote device is part of the communication system.

5. The media device of claim 4,
wherein the communication system interface is configured to communicate wireless communication signals between the media device and the communication system, and
wherein at least a portion of the second communication link established between the media device and the remote device is part of the communication system.

6. The media device of claim 1,
wherein the received emulated information comprises emulated active information corresponding to a virtual touch sensitive controller presented as a selectable image on the second display of the mobile media device,
wherein the virtual touch sensitive controller is configured to cause the mobile media device to execute a predefined function, and
wherein the first display is a first touch sensitive display, wherein the first touch sensitive display is larger than the second display of the mobile media device,
wherein the processor system of the media device is further configured to:
  generate an image corresponding to the virtual touch sensitive controller based upon the received emulated active information; and
  communicate image information corresponding to the image of the virtual touch sensitive controller to the first touch sensitive display,
wherein the image of the virtual touch sensitive controller presented on the first touch sensitive display is substantially the same as the image of the virtual touch sensitive controller presented on the second display of the mobile media device, and
wherein the image of the virtual touch sensitive controller presented on the first touch sensitive display is substantially larger than the image of the virtual touch sensitive controller presented on the second display of the mobile media device.

7. The media device of claim 6 further comprising:
a presentation device interface communicatively coupled to the processor system and configured to:
  communicatively couple the media device to the first display, and
  receive information from the first touch sensitive display corresponding to at least touch location information identifying a touch location of a user's digit on the first touch sensitive display,
wherein the processor system of the media device is further configured to:
  determine whether the touch location information corresponds to a location of the virtual touch sensitive controller;
  generate command and control information in response to the touch location information corresponding to the location of the virtual touch sensitive controller; and
  communicate the command and control information from the media device to the mobile media device, via the first communication link, wherein the command and control information corresponds to a function associated with the virtual touch sensitive controller, and wherein the command and control information is configured to operate the mobile media device in accordance with the function of the virtual touch sensitive controller.

8. The media device of claim 1, wherein the at least one high resolution image presented on the first display corresponds to an entirety of a web page associated with the received high resolution image data, and wherein the low resolution image presented on the second display of the mobile device corresponds to a portion of the web page.

9. The media device of claim 1, further comprising:
a remote interface communicatively coupled to the processor system and configured to communicatively couple the media device to a remote control,
wherein a wireless signal communicated from the remote control to the media device causes the media device to select the media content event from the media content stream such that the media content event is communicated to the first display for presentation, and
wherein the media content event and the at least one high resolution image are concurrently presented on the first display.

10. The media device of claim 9,
wherein the received emulated information comprises emulated active information corresponding to a virtual touch sensitive controller presented as a selectable image on the second display of the mobile media device,
wherein the virtual touch sensitive controller is configured to cause the mobile media device to execute a predefined function, and
wherein the processor system of the media device is further configured to:
  generate an image corresponding to the virtual touch sensitive controller based upon the received emulated active information, wherein the image corresponding to the virtual touch sensitive controller is presented on the first display;
  receive a selection signal from the remote control corresponding to selection of the virtual touch sensitive controller presented on the first display,
  generate command and control information in response to the selection signal received from the remote control; and
  communicate the command and control information from the media device to the mobile media device, via the first communication link, wherein the command and control information corresponds to a function associated with the virtual touch sensitive controller, and wherein the command and control information is configured to operate the mobile media device in accordance with the function of the virtual touch sensitive controller.

11. The media device of claim 1, wherein the mobile device interface is further configured to:
communicatively couple the media device to a remote control,
wherein a communication medium used by the first communication link established between the mobile media device and the media device is the same communication medium that is used by the remote control.

12. A method of operating a media device, wherein the media device is configured to provide a media content event to a first display that is communicatively coupled to the media device, comprising:
- communicatively coupling the media device and a mobile media device via a first communication link;
- receiving, at the media device via the first communication link, emulated information from the mobile media device, wherein the emulated information corresponds to at least one image that is being currently presented on a second display of the mobile media device, wherein the emulated information includes at least information, which identifies a remote device that is configured to provide at least one high resolution image to the media device;
- establishing a second communication link between the media device and the remote device, wherein the second communication link is established in response to the media device receiving the emulated information from the mobile media device via the first communication link, and wherein the second communication link is different from the first communication link;
- receiving, at the media device via the second communication link, high resolution image data from the remote device, wherein the received high resolution image data includes sufficient data to generate the at least one high resolution image;
- generating, at the media device, the at least one high resolution image based upon the high resolution image data received from the remote device, wherein the at least one high resolution image is configured for presentation on the first display; and
- communicating the generated at least one high resolution image to the first display,
- wherein the communicated at least one high resolution image is presentable on the first display concurrently with presentation of the at least one image that is being currently presented on the second display of the mobile media device.

13. The method of claim 12, wherein the at least one image presented on the second display of the mobile media device has an image resolution that is less than resolution of the at least one high resolution image presented on the first display.

14. The method of claim 12,
- wherein the first display is substantially larger than the second display of the mobile media device,
- wherein the at least one high resolution image presented on the first display communicatively coupled to the media device is substantially the same as the at least one image that is being currently presented on the second display of the mobile media device, and
- wherein the at least one high resolution image presented on the first display communicatively coupled to the media device is substantially larger than the at least one image that is being currently presented on the second display of the mobile media device.

15. The method of claim 12, wherein receiving the emulated information comprises:
- receiving, at the media device from the mobile media device via the first communication link, image data corresponding to a graphic icon presented on the second display of the mobile media device, wherein the graphic icon is configured to control at least one operation of the mobile media device,
- generating, at the media device, at least one additional image corresponding to the graphic icon, and
- presenting the at least one additional image corresponding to the graphic icon on the first display,
- wherein a change in operation of the mobile media device by a user of the mobile media device causes a corresponding change in the image of the graphic icon presented on the first display.

16. The method of claim 12, wherein the first display is a first touch sensitive display, wherein the second display of the mobile media device is a second touch sensitive display, and wherein receiving the emulated information comprises:
- receiving, at the media device from the mobile media device via the first communication link, emulated active information corresponding to a virtual touch sensitive controller presented on the second touch sensitive display of the mobile media device,
  - wherein the emulated active information comprises image information configured to present a selectable image associated with the virtual touch sensitive controller being presented on the second touch sensitive display of the mobile media device, and
  - wherein the emulated active information is configured to cause the mobile media device to execute a predefined function;
- generating, at the media device, an image corresponding to the selectable image associated with the virtual touch sensitive controller based upon the received emulated active information; and
- communicating the image of the virtual touch sensitive controller to the first display for presentation on the first touch sensitive display,
- wherein the image of the virtual touch sensitive controller presented on the first touch sensitive display is substantially the same as the image of the virtual touch sensitive controller presented on the second touch sensitive display of the mobile media device, and
- wherein the image of the virtual touch sensitive controller presented on the first touch sensitive display is substantially larger than the image of the virtual touch sensitive controller presented on the second touch sensitive display of the mobile media device.

17. The method of claim 16, further comprising:
- receiving, at the media device, a wireless signal from a remote control, wherein the received wireless signal from the remote control corresponds to a selection of the image of the virtual touch sensitive controller presented on the first touch sensitive display; and
- communicating a signal from the media device to the mobile media device via the first communication link, wherein the signal corresponds to the selection of the image of the virtual touch sensitive controller,
- wherein the signal causes the mobile media device to execute a predefined function.

18. The method of claim 17, wherein an infrared communication medium is used by the first communication link established between the mobile media device and the media device, and wherein the infrared communication medium is used by the remote control to communicate the wireless signal to the media device.

19. The method of claim 12, wherein the first display is a component of a visual presentation device.

20. The method of claim 12, further comprising:
- receiving, at the media device, a wireless signal from a remote control, wherein the received wireless signal from the remote control, wherein the wireless signal causes the media device to change the at least one high resolution image that is being presented on the first display; and communicating a signal from the media device to the mobile media device via the first communication link, wherein the signal corresponds to a change made to the at least one high resolution image, wherein the signal causes the mobile media device to make the change to the at least one image that is being currently presented on the second display of the mobile media device, and wherein change to the at least one image that is being currently presented on a second display corresponds to the change made to the at least one high resolution image.

\* \* \* \* \*